United States Patent [19]

Copp

[11] Patent Number: 4,734,939
[45] Date of Patent: Apr. 5, 1988

[54] AIRCREW HEADGEAR

[75] Inventor: Warren K. Copp, Fleet, England

[73] Assignee: The Secretary of State for Defence in Her Britannic Majesty's Government of the United Kingdom of Great Britain and Northern Ireland, London, England

[21] Appl. No.: 754,904

[22] Filed: May 15, 1985

[30] Foreign Application Priority Data

May 17, 1984 [GB] United Kingdom ............... 8412587

[51] Int. Cl.$^4$ .......................... A42B 1/24; A42B 3/00
[52] U.S. Cl. ............................................ 2/422; 2/6; 2/424; 350/547
[58] Field of Search .................. 2/1, 429, 441, 443, 2/6, 433, 422, 424, 426; 244/122 A, 122 AB, 122 AC, 122 AD, 122 AE, 122 AF, 122 AG, 122 AH; 350/145, 146, 547; 254/410

[56] References Cited

U.S. PATENT DOCUMENTS

| 3,158,344 | 11/1964 | Koochembere | 244/122 AG |
| 3,178,136 | 4/1965 | Bayer | 244/122 AG |
| 3,366,972 | 2/1968 | Wise et al. | 2/6 |
| 3,884,436 | 5/1975 | Poehlmann | 244/122 A |
| 4,170,042 | 10/1979 | Aileo | 2/6 X |

Primary Examiner—John F. Terapane
Assistant Examiner—John S. Maples
Attorney, Agent, or Firm—William R. Hinds

[57] ABSTRACT

Means for ejecting NVG's from an aircrewman's helmet during an ejection seat escape, and wherein the NVG carrier is attached to the helmet via an intermediate anchorage normally on the helmet, the intermediate anchorage being arranged for separation from the helmet, still carrying the NVG carrier, during ejection, and being cord linked to an anchorage in the aircraft.

6 Claims, 3 Drawing Sheets

AIRCREW HEADGEAR

BACKGROUND OF THE INVENTION

1. Field of the Invention

The present invention relates to means for mounting equipment, such as optical equipment on a protective helmet and for detaching said equipment from the helmet upon initation of an ejection seat. When optical equipment is mounted on aircrew protective headgear, it is usually to the fore thereof. If it were to remain attached to the protective helmet during ejection of the aircrew from an aircraft, loads are, consequently, likely to be imposed upon the aircrewman which could be fatally unacceptable. However it is also important that the equipment is not jettisoned so freely that a risk arises of injury to the aircrewman or any colleague and that their vital equipment is not damaged.

2. Objects of the Invention

It is an object of the present invention to provide means for manually attaching and detaching optical equipment mounted on aircrew protective headgear and also for remotely controlled jettisoning of the equipment therefrom and yet restraining the equipment after detachment from the headgear so as to minimize the risk of injury or damage to essential personal equipment.

BRIEF SUMMARY OF THE INVENTION

The releasable attachment means of the present invention includes two cooperable components, a first one for mounting on a helmet and a second one for carrying equipment. The first component comprises a plate and engagement means extending therefrom which may, for example, comprise at least one notched pin. The second component incorporates a guide for locating said engagement means and a manually rotatable, resiliently-biassed lever having a jaw which is engageable with the engagement means to enable attachment of the two components to one another. The second component also incorporates a slidable member, operable in emergency by release means such as, for example, a reel-in cable, which has a cam surface engageable with the jaw so that the jaw can be rotated out of engagement with the engagement means and thereby cause separation of the two components.

Using this invention, an aircrewman is able to manually attach and detach helmet-mounted equipment and furthermore in the event of emergency such as initiation of his ejection seat, the equipment can be jettisoned automatically and reeled away from him, so reducing the likelihood of personal injury.

The reel-in cable may be associated with an ejection seat so that movement of the latter pulls said cable. However, an independent motor is preferred.

A further feature of the invention provides for deployment of a safety visor subsequent to the separation of the equipment from the helmet in an emergency. The visor deployment facility may incorporate a visor cable arranged to pull the visor down over the aircrewman's face on operation of said release means. The visor cable may be arranged to be severed after visor deployment by a cutter mounted on the helmet. The cable may be wire or a suitable plastics filament or cord.

When the equipment is not required by the aircrewman, it may be stowed away in a holder which may be mounted on the cockpit wall or the ejector seat.

DESCRIPTION OF THE DRAWINGS

In order that the present invention may be more easily understood optical equipment release apparatus in accordance with the present invention will now be described by way of example with reference to the accompanying drawings, of which:

FIG. 1a is an isometric view of a helmet mount,

DESCRIPTION OF PREFERRED EMOBIDMENTS

Figure 1:
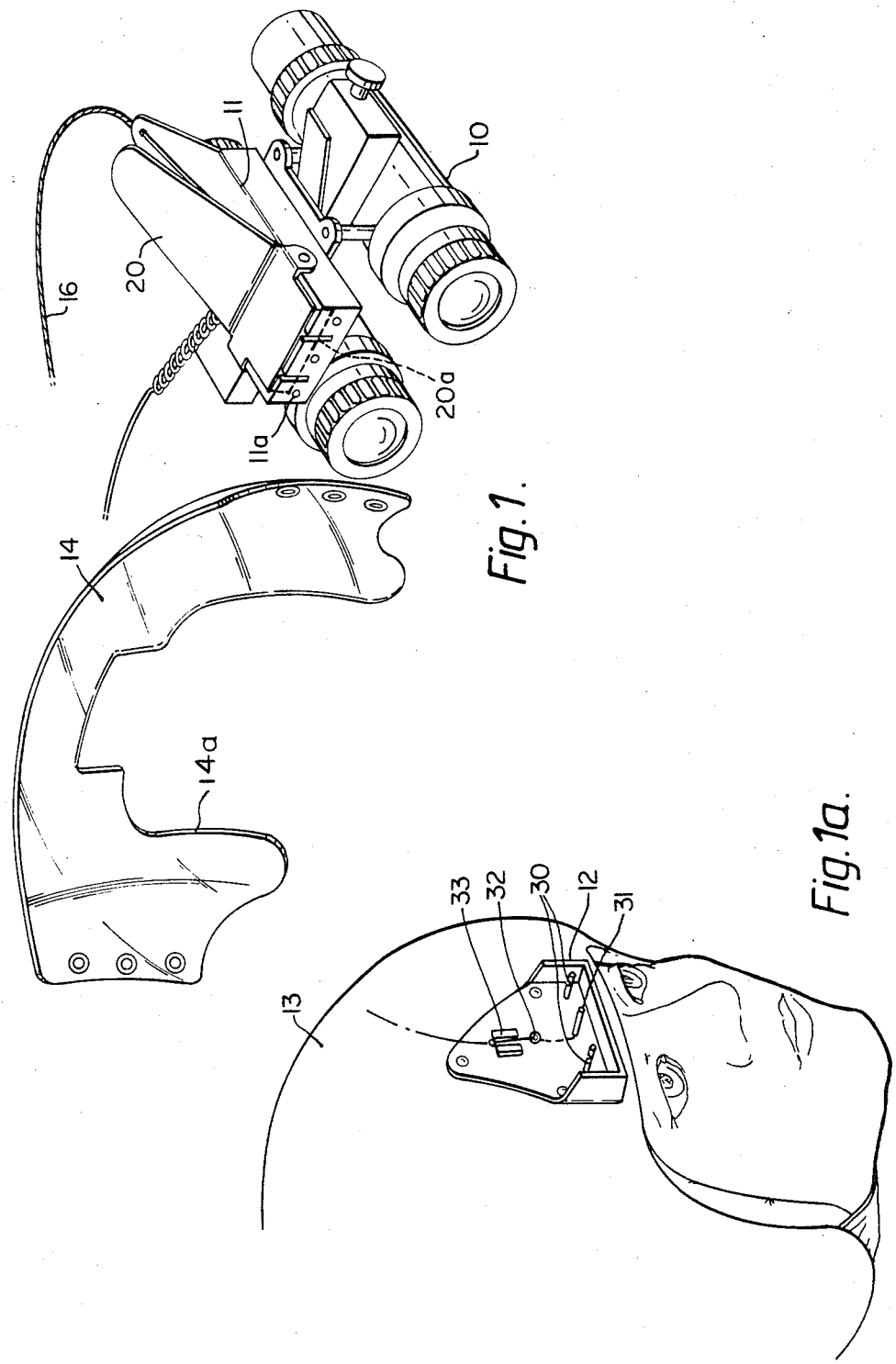
FIG. 1 is an isometric view of the apparatus.

As shown in the drawings, optical equipment 10 is carried on a carrier 11 arranged for detachable attachment to a helmet mount 12 on the brow of an aircrewman's helmet 13. The helmet 13 also carries a birdstrike visor 14 and an outer visor 15. An optical equipment release apparatus includes a release cable 16 and a fast reel-in arm 17.

Figure 2:
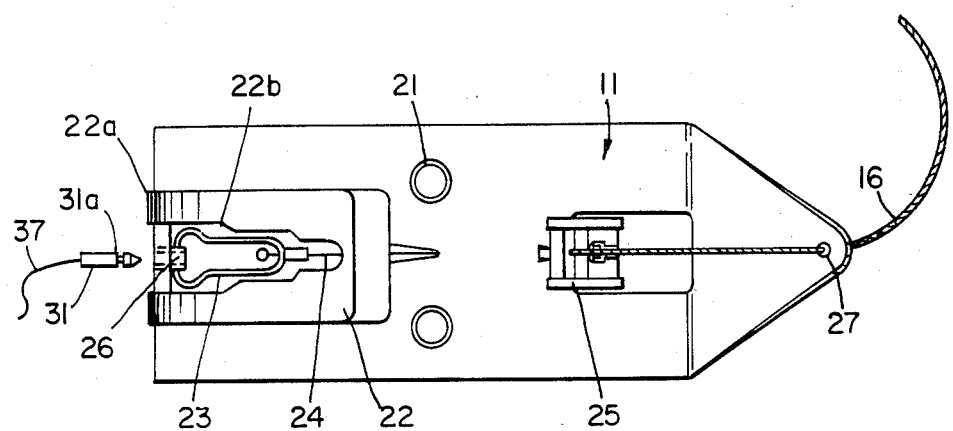
FIG. 2 is a part exploded view of a helmet mount.
Figure 3:
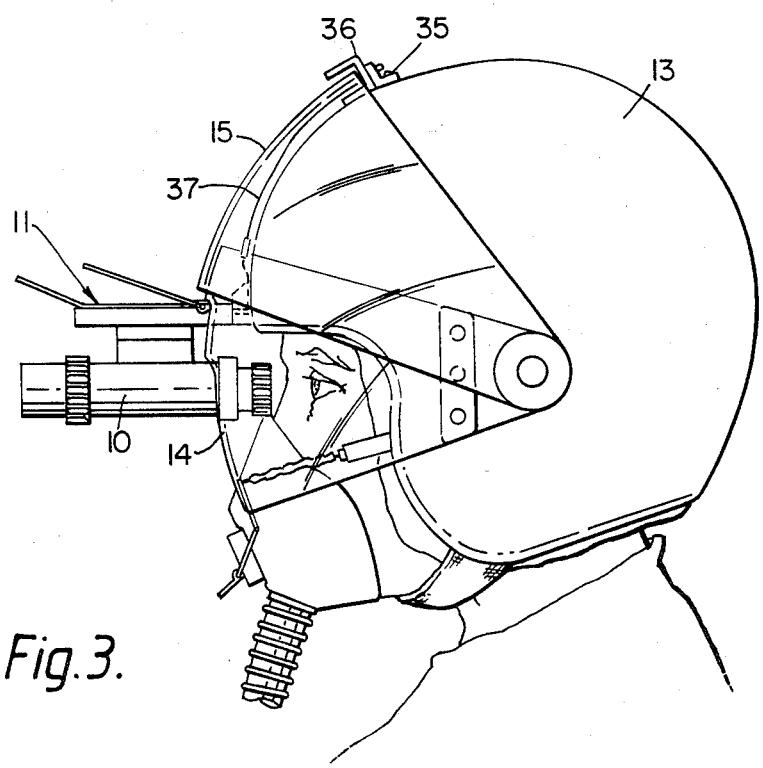
FIG. 3 is a side view illustrating a visor lower facility.

The carrier 11 has a gripper lever 20 pivotally attached thereto and incorporating an engagement jaw 20a, and grip pin guide holes 11a. The lever 20 is urged closed to grip the helmet mount by springs 21. FIG. 2 shows the carrier with lever 20 removed. Beneath the lever 20, are springs 21 for urging the lever closed. The carrier 11 holds a slider block 22 which incorporates lever lifting cams 22a and caliper closure cam surfaces 22b, a spring caliper 23 attached via an adjustable link 24 to a spring loaded throwover link 25, and a caliper wedge 26. The release cable 16 passes through a director eye 27 on the carrier 11 and is enclosed in the link 25.

The helmet mount 12 is recessed to receive snugly the carrier 11 and carries notched pins 30 arranged for centering the guide hole 11a and being engaged by the lever jaw 20a, a visor lowering pin 31 having a groove 31a, a cutting edge 32 and a snubber 33.

Mounted on the helmet 13 above the visors 14 15 in their stowed configuration, is a visor operator comprising an anchorage 35, a bracket 36 and a cable 37. The anchorage 35 is attached to the helmet and the bracket 36 is retained on the anchorage 35 during normal operation of the visors 14, 15. The cable 37 extends between the bracket 36 and the pin 31 via the snubber 33 and past the cutting edge 32.

Figure 4:
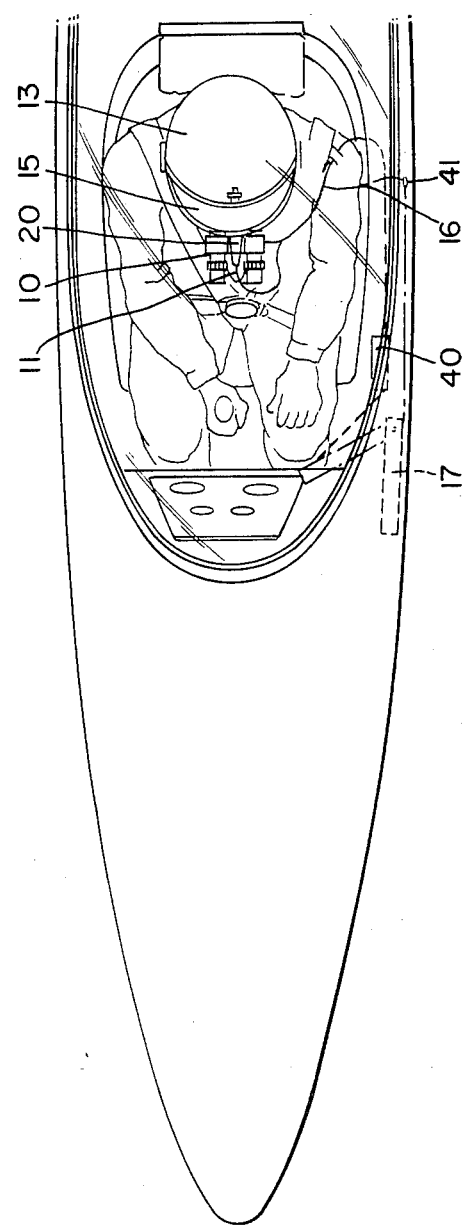
FIG. 4 is a plan view of an aircraft cockpit.

FIG. 4 shows the apparatus in an aircraft cockpit. A fast reel-in arm 17 is mounted on a hinge on the cockpit wall, alongside a motor and optical equipment stowager box 40. Thus the arm 17 normally lies along the wall and is arranged for deployment on tensioning the cable 16. The box 40 carries a retainer for the optical equipment similar to that shown in FIG. 1a. The cable 16 therefore passes from the motor box 40, via the arm 17 and a clip 41 to the director eye 27 and the link 25. The clip 41 is attached to the cockpit wall.

As shown in FIG. 1 the inner, bird strike visor 14 is recessed, at 14a, to accommodate the helmet mount 12.

During normal flying activities the optical equipment may be stowed in the box 40. When the aircrewman wishes to use the optical equipment he unclips it from the box 40, and clips it into his mount 12, using the lever 20. As the carrier 11 enters the recess in the mount 12 the notched pins 30 enter the carrier holes 11a and the visor lowering pin 31 enters the edge 26. When these are fully engaged the jaw 20a of the lever 20 catches in the notches of the pins 30, and the groove 31a in the visor lowering pin 31 protrudes beyond the wedge 26. The clip 41 is so positioned with respect to the box 40 and the arm 17 that the cable 16 has no slack when the equipment is stowed, but also so that the cable 16 passes over the aircrewman's shoulder with just sufficient slack for head and body movement when the equipment is mounted on his helmet 13.

When the aircrewman wishes to restow the optical equipment he grips the carrier 11, depressing the lever 20 so that the jaw 20a is lifted and he is able to withdraw the equipment from the mount 12. The slider 22 and the caliper 23 remain in the stowed configuration.

In the event of ejection being initiated while the optical equipment is mounted on the helmet 13, the motor commences winding in the cable 16. As it is being tensioned the cable 16 leaves the clip 41 and deploys the arm 17. Then the cable 16 will be pulling from ahead of the aircrewman's head, and will pull back the throw-over link 25 and hence the link 24 and the caliper 23. As the caliper 23 leaves the wedge 26 it springs closed onto the visor lowering pin 31 and into the groove 31a thereof. At the same time the caliper 23 engages the cam surface 22b of the slider 22 and begins to draw the slider back while being held closed by the cam surfaces 22b. The lifting cam surfaces 22a lift the jaw 20a of the lever 20, releasing the carrier 11 from the mount 12. As the cable 16 continues to haul the optical equipment on to the arm 17 the caliper 23 draws the visor lowering pin 31 and hence the cable 37. The bracket 36 is pulled away from the anchorage 35 and engages and lowers the visor 15. When the visor is fully down the cable 31 is cut by the cutter 32, the visor being held down by virtue of the snubber 33 gripping the cable 31. As the optical equipment completes its journey to the arm 17, ejection of the aircrewman continues, so that the optical equipment avoids his person.

The optical visor may also be spring loaded and have spring means which will tend to urge the visors into the deployed position. The spring means may assist the deployment and be retained by catch means, the catch means being releasable upon deployment of the optical equipment ejection system.

It is to be appreciated that the optical equipment for which this invention may be used is not limited to binocular type apparatus illustrated in the figures but may be any form of desired helmet mounted equipment.

I claim:

1. Releasable attachment means for attaching equipment to a helmet comprising a first part for mounting on a helmet and including:
    a plate and
    engagement means extending therefrom; and
    a second part for carrying equipment and engageable with said first part, the second part including:
    a base plate,
    a face plate mounted on said base plate and incorporating guide means for locating said engagement means, a manually-rotatable, resiliently-biassed lever pivotably mounted on said base plate and incorporating a jaw which is engageable with said engagement means to engage said first and second parts, a slidable member located on said base plate and having a cam surface engageable with said jaw, and release means operable in emergency to slide said slidable member so that the cam surface engages with the jaw and rotates the jaw out of engagement with said engagement means and hence releases the first part from the second part.

2. Releasable attachment means as claimed in claim 1 in which said engagement means comprises at least one notched pin.

3. Releasable attachment means as claimed in claim 1 in which said release means comprises a reel-in cable connecting the slidable member with an aircraft mountable reel-in device.

4. Releasable attachment means as claimed in claim 1 in combination with a helmet in which the helment incorporates a visor, and further comprising emergency visor deployment means including:
    a visor lowering pin attached to the visor by a visor cable and manually engageable in said second part; and
    resiliently biassed gripping means adapted to engage with the visor lowering pin on operation of said release means and retain the visor lowering pin in said second part.

5. Releasable attachment means as claimed in claim 4 including visor cable cutting means mounted on said first part for cutting said visor cable when the visor has deployed after operation of said release means.

6. Releasable attachment means as claimed in claim 4 in which said release means comprises a reel-in cable connecting said resiliently-biassed gripping means with an aircraft-mountable reel-in device, said resiliently-biassed gripping means being adapted to engage with said slidable member on actuation of said release means.

* * * * *